(12) United States Patent
Zhang et al.

(10) Patent No.: US 12,442,793 B2
(45) Date of Patent: Oct. 14, 2025

(54) INTELLIGENT INVERSION METHOD FOR PIPELINE DEFECTS BASED ON HETEROGENEOUS FIELD SIGNALS

(71) Applicant: Northeastern University, Shenyang (CN)

(72) Inventors: Huaguang Zhang, Shenyang (CN); Jinhai Liu, Shenyang (CN); Lei Wang, Shenyang (CN); Jiayue Sun, Shenyang (CN); Jian Feng, Shenyang (CN); Gang Wang, Shenyang (CN); Dazhong Ma, Shenyang (CN); Senxiang Lu, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 403 days.

(21) Appl. No.: 18/028,010

(22) PCT Filed: Nov. 6, 2020

(86) PCT No.: PCT/CN2020/126885
§ 371 (c)(1),
(2) Date: Mar. 23, 2023

(87) PCT Pub. No.: WO2022/088226
PCT Pub. Date: May 5, 2022

(65) Prior Publication Data
US 2023/0341354 A1    Oct. 26, 2023

(30) Foreign Application Priority Data
Oct. 30, 2020  (CN) .......................... 202011186863.4

(51) Int. Cl.
*G01N 27/83*    (2006.01)
*G01B 7/02*    (2006.01)

(52) U.S. Cl.
CPC ............... *G01N 27/83* (2013.01); *G01B 7/02* (2013.01)

(58) Field of Classification Search
CPC .................................. G01N 27/83; G01B 7/02
See application file for complete search history.

(56) References Cited

U.S. PATENT DOCUMENTS

| | | | |
|---|---|---|---|
| 2013/0124109 A1 | 5/2013 | Denenberg et al. | |
| 2017/0176390 A1* | 6/2017 | Yu .............................. | G01V 3/15 |

(Continued)

FOREIGN PATENT DOCUMENTS

| | | |
|---|---|---|
| CN | 104990977 A | 10/2015 |
| CN | 106018545 A | 10/2016 |

(Continued)

OTHER PUBLICATIONS

Liu, Jinhai et al., "MFL inner detection based defect recognition method", Chinese Journal of Scientific Instrument, vol. 37, No. 11, Nov. 30, 2016, ISSN: 0254-308, pp. 2572-2581.

*Primary Examiner* — Lina Cordero
*Assistant Examiner* — Lyudmila Zaykova-Feldman
(74) *Attorney, Agent, or Firm* — MUNCY, GEISSLER, OLDS & LOWE, P.C.

(57) ABSTRACT

Provided is an intelligent inversion method for pipeline defects based on heterogeneous field signals. The method includes the following steps: firstly, acquiring heterogeneous field signals, performing an abnormality judgement, then correcting base values of the heterogeneous field signals, and performing denoising treatment; padding the denoised heterogeneous field signals corresponding to the pipeline defects, unifying the heterogeneous field signals of different sizes into the heterogeneous field signals of same sizes, and performing a nonlinear transformation on signal amplitudes; designing a sparse autoencoder with an axisymmetric structure, and obtaining primary characteristics of the heteroge- (Continued)

neous field signals; classifying the pipeline defects according to lengths, widths and depths to obtain category labels of the pipeline defects; designing a multi-classification neural network to classify the heterogeneous field signals, and extracting deep characteristics containing defect size information; and constructing a random forest regression model to realize intelligent inversion for sizes of the pipeline defects.

8 Claims, 3 Drawing Sheets

(56) References Cited

U.S. PATENT DOCUMENTS

| | | | |
|---|---|---|---|
| 2019/0178844 A1* | 6/2019 | Lott | G01R 33/028 |
| 2019/0226322 A1* | 7/2019 | Khalaj Amineh | G01V 3/28 |
| 2020/0210826 A1* | 7/2020 | Liu | G06N 3/08 |
| 2020/0284760 A1* | 9/2020 | Li | G01N 27/83 |
| 2021/0285915 A1* | 9/2021 | Chen | E21B 47/092 |

FOREIGN PATENT DOCUMENTS

| | | |
|---|---|---|
| CN | 109632942 A | 4/2019 |
| CN | 109783906 A | 5/2019 |
| CN | 110220966 A | 9/2019 |

\* cited by examiner

INTELLIGENT INVERSION METHOD FOR PIPELINE DEFECTS BASED ON HETEROGENEOUS FIELD SIGNALS

BACKGROUND OF THE INVENTION

1. Field of the Invention

The invention relates to the technical field of nondestructive testing, and in particular to an intelligent inversion method for pipeline defects based on heterogeneous field signals.

2. The Prior Arts

With the increase of national demands for oil, natural gas and other energy, pipeline transportation is widely used because of low cost, high efficiency and good safety. However, some pipelines have damaged pipeline walls due to long laying time and impact of transportation media, natural environment, and the like. If perforation, leakage and other accidents occur at a certain location of a long-distance pipeline, the transportation of resources on the pipeline will be terminated, thereby seriously affecting people's normal life and bringing incalculable economic losses. Therefore, in order to ensure safe, reliable and effective completion of transportation tasks of the long-distance pipeline, it is very important to perform regular inspection and maintenance on the long-distance pipeline. In order to accurately determine the sizes of the pipeline defects, defect inversion is often performed based on heterogeneous field signals. The heterogeneous field signals comprise magnetic flux leakage signals, eddy current signals, ultrasonic signals and other types of signals.

Defect inversion is a technology to extract geometric information of defects from data by various characteristic extraction methods. The effective information can help data analysts determine the lengths, the widths and the depths of the defects. The heterogeneous field signals obtained by an internal detector are seriously affected by the actual detection conditions (pipeline wall thickness, materials, inner diameter size, service location, and service life), and signal peak-valley difference, surface energy, defect waveform and other characteristics are very different. In the process of defect inversion, it is necessary to artificially re-design parameters for characteristic extraction and update an inversion algorithm model for different heterogeneous field signals. This leads to poor universality of a characteristic extraction technology relying on artificial experience and low accuracy of defect inversion. Therefore, design of the intelligent inversion method for pipeline defects based on heterogeneous field signals is of great significance to daily maintenance and fault detection of pipelines.

SUMMARY OF THE INVENTION

To solve the technical problem, the present invention provides an intelligent inversion method for pipeline defects based on heterogeneous field signals to overcome the shortcomings of traditional defect inversion methods and improve inversion accuracy of the pipeline defects.

In order to solve the technical problem, the intelligent inversion method for pipeline defects based on heterogeneous field signals is characterized by comprising the following steps:

Step 1: acquiring heterogeneous field signals of each sampling point in a certain section of a pipeline in real time, performing an abnormality judgement on the acquired heterogeneous field signals, and then correcting base values of the heterogeneous field signals of each sampling point by an improved average median method.

Step 1.1: acquiring the heterogeneous field signals of each sampling point in a certain section of the pipeline in real time through a plurality of sensors, and performing the abnormality judgement on the acquired heterogeneous field signals, wherein when an intensity $D_{(i,j)}$ of the heterogeneous field signals meets the following formula, the heterogeneous field signals are judged to be abnormal:

$$D_{(i,j+1)} - D_{(i,j)} > 50 \times (D_{(i,j)} - D_{(i,j-1)}).$$

Wherein $D_{(i,j)}$ is the intensity of the heterogeneous field signals of an i-th sensor at a sampling point j, $D_{(i,j-1)}$ is the intensity of the heterogeneous field signals of the i-th sensor at a sampling point j−1, $D_{(i,j+1)}$ is the intensity of the heterogeneous field signals of the i-th sensor at a sampling point j+1, i=1, 2, ..., I, I is the number of the sensors carried by a detector in the pipeline, j=1, 2, ..., J, and J is the number of sampling points in the pipeline.

If the heterogeneous field signals are abnormal signals, replacing the intensity of the heterogeneous field signals at an abnormal point with an average value of the intensity of the heterogeneous field signals at a sampling point before the abnormal point and a sampling point after the abnormal point.

Step 1.2: correcting the base values of the heterogeneous field signals of each sampling point, obtained by the sensors, wherein a base value correction method is as follows:

$$D_{(i,j)ans} = D_{(i,j)} - D_{(i,j)mid} + \sqrt{\frac{1}{k-2}\left(\sum_{j=1}^{k-3} D_{(i,j)} - D_{(i,j)max} - D_{(i,j)min} - D_{(i,j)mid}\right)^2},$$

$$\text{and } D_{(i,j)mid} = \frac{V_{(i,j)mid} - V_{ref}}{P \cdot sens}.$$

Wherein $D_{(i,j)ans}$ is a signal intensity of the corrected heterogeneous field signals at the sampling point j by the i-th sensor; k represents the channel number of the sensors; $D_{(i,j)mid}$ is a median value of the heterogeneous field signals acquired by all channels of the i-th sensor at the sampling point j, and $D_{(i,j)max}$ is a maximum value of the heterogeneous field signals acquired by all channels of the i-th sensor at the sampling point j; $D_{(i,j)min}$ is a minimum value of the heterogeneous field signals acquired by all channels of the i-th sensor at the sampling point j; $V_{(i,j)mid}$ mid is a median value of output voltages of the i-th sensor; $V_{ref}$ is a reference voltage value of a Hall sensor carried by the detector in the pipeline; P is an amplification factor of the output voltage of the Hall sensor carried by the detector in the pipeline; and sens is sensitivity of the output voltage of the Hall sensor carried by the detector in the pipeline.

Step 2: denoising the heterogeneous field signals of each sampling point, treated in Step 1, by a wavelet analysis method.

According to characteristics of the acquired heterogeneous field signals at each sampling point by the sensors, selecting Sym10 as a wavelet basis function, and obtaining an intensity $D_{(i,j)result}$ of the denoised heterogeneous field signals through wavelet decomposition, heuristic wavelet thresholding and wavelet reconstruction.

Step 3: padding the denoised heterogeneous field signals corresponding to the pipeline defects, unifying the heterogeneous field signals of different sizes into the heterogeneous field signals of the same size, wherein 0 is used for completion in a direction of the sampling point, and a median value of the heterogeneous field signals is used for completion in a direction of signal amplitudes, and performing a nonlinear transformation on the signal amplitudes.

Step 3.1: setting dimensions of a heterogeneous field signal matrix corresponding to a t-th pipeline defect, acquired by the 1-th sensor, as $x^t_i \times y^t_i$, and by the padding operation, using 0 to complete a row vector of the heterogeneous field signal matrix to m on left and right sides of $x^t_i$, m=max($x^t_i$), t=1, 2, ..., p, wherein p is the total number of the pipeline defects in this section of the pipeline.

Step 3.2: by the padding operation, using the median value of the heterogeneous field signals to complete a column vector of the heterogeneous field signal matrix to n on upper and lower sides of $y^t_i$, n=max($y^t_i$).

Step 3.3: after treatment in steps 3.1 to 3.2, unifying the sizes of the heterogeneous field signals corresponding to all the pipeline defects, acquired by each sensor, to be m×n, then performing the nonlinear transformation on the heterogeneous field signals with the unified sizes, and compressing the signal amplitudes.

Step 4: converting the heterogeneous field signal matrix corresponding to the pipeline defects, treated by the nonlinear transformation, into a data matrix with the same input dimensions as a sparse autoencoder.

Converting the heterogeneous field signal matrix corresponding to the pipeline defects, with the dimensions of m×n and treated by the nonlinear transformation into a matrix $D'_{(m \times n, 1)}$ with dimensions of (m×n, 1).

Step 5: designing the sparse autoencoder with an axisymmetric structure, inputting the heterogeneous field signal matrix $D'_{(m \times n, 1)}$ corresponding to the converted pipeline defects with the dimensions of (m×n,1) into the sparse autoencoder, obtaining primary characteristics of the heterogeneous field signals corresponding to the pipeline defects, and saving a weight of an encoding part of the sparse autoencoder.

Step 5.1: designing the sparse autoencoder with A layers with the axisymmetric structure, wherein first $$\frac{A+1}{2}$$

layers form an encoder part, last $$\frac{A+1}{2}$$

layers form a decoder part, and A is an odd number greater than or equal to 3.

Step 5.2: copying the weight $W_{Encoder}$ of the encoder part of the sparse autoencoder to the decoder part to halve parameters of the sparse autoencoder.

Step 5.3: setting the number of neurons in each layer of the sparse autoencoder to be $S_a$, a=1, 2, ..., A, wherein inputs are the heterogeneous field signals $D'_{(m \times n, 1)}$ corresponding to all the pipeline defects with the dimensions of (m×n,1), and outputs are eigenvectors $F_{(m \times n, 1)}$ reconstructed by the encoder part and the decoder part, using the following formula as a loss function of the sparse autoencoder, and training a sparse autoencoder model by minimizing the loss function;

$$\text{error}(D_{(m \times n, 1)}, F_{(m \times n, 1)}) = \frac{\sqrt[3]{\sum_{t=1}^{p} \left(D^t_{(m \times n, 1)} - F^t_{(m \times n, 1)}\right)^2 + \alpha}}{p}.$$

Wherein error( ) is the loss function, $D^t_{(n \times m, 1)}$ is heterogeneous field signals corresponding to the t-th pipeline defect with the dimensions of (m×n,1), $F^t_{(m \times n, 1)}$ is an eigenvector reconstructed by the encoder part and the decoder part, α is a paranoid factor, and its value range is 1.1-4.8.

Step 5.4: taking an eigenvector $F_{mid}$ of the $$\frac{A+1}{2} - \text{th}$$

layer of the sparse autoencoder as the primary characteristics of the heterogeneous field signals corresponding to the pipeline defects.

Step 6: classifying lengths, widths and depths of the pipeline defects to obtain category labels of the pipeline defects.

Setting the number of categories of the lengths, the widths and the depths of the pipeline defects to be $n_{class}$, and classifying the lengths $y_{length}$, the widths $y_{width}$ and the depths $y_{depth}$ of the pipeline defects according to the following formula to obtain the category labels of the pipeline defects concerning the lengths, the widths and the depths, wherein $$y_{length-class} = \left\lfloor n_{class} \times \log_{10}\left(1 + \frac{y_{length} - y_{length-min}}{y_{length-max} - y_{length-min}} \times 9\right)\right\rfloor,$$

$$y_{width-class} = \left\lfloor n_{class} \times \log_{10}\left(1 + \frac{y_{width} - y_{width-min}}{y_{width-max} - y_{width-min}} \times 9\right)\right\rfloor, \text{ and}$$

$$y_{depth-class} = \left\lfloor n_{class} \times \log_{10}\left(1 + \frac{y_{depth} - y_{depth-min}}{y_{depth-max} - y_{depth-min}} \times 9\right)\right\rfloor.$$

Wherein $y_{length-class}$, $y_{width-class}$ and $y_{deep-class}$ are the category labels for the lengths, the widths and the depths of the pipeline defects, $y_{length-max}$ is a maximum length of the heterogeneous field signals corresponding to all the pipeline defects, $y_{length-min}$ is a minimum length of the heterogeneous field signals corresponding to all the pipeline defects, $y_{width-max}$ is a maximum width of the heterogeneous field signals corresponding to all the pipeline defects, $y_{width-min}$ is a minimum width of the heterogeneous field signals corresponding to all the pipeline defects, $y_{depth-max}$ is a maximum depth of the heterogeneous field signals corresponding to all the pipeline defects, and $y_{depth-min}$ is a minimum depth of the heterogeneous field signals corresponding to all the pipeline defects.

Step 7: designing a Softmax-based multi-classification neural network to classify the heterogeneous field signals corresponding to the pipeline defects in a supervised manner, and further extracting deep characteristics containing defect size information.

Step 7.1: designing a Softmax-based b-layer classification neural network, wherein $$b > \frac{A+1}{2}.$$

Step 7.2: in the b-layer classification neural network, setting a structure and parameters of each layer in the first $$\frac{A+1}{2}$$

layers to be consistent with those of the encoding part of the sparse autoencoder.

Step 7.3: setting the output category number of the classification neural network to be $n_{class}$, and using default neural network initialization parameters at a $$\frac{A+1}{2}$$

~b-th layer of the classification neural network.

Step 7.4: taking the heterogeneous field signals corresponding to the pipeline defects with dimensions of (m×n,1) as inputs, and the category labels of the lengths, the widths and the depths of each pipeline defect as outputs, and after training the classification neural network, taking characteristics $F_b$ of the b-th layer as the deep characteristics of the heterogeneous field signals corresponding to the pipeline defects.

Step 8: taking the deep characteristics $F_b$ of the heterogeneous field signals corresponding to the pipeline defects extracted in Step 7 as inputs, and real size information of the heterogeneous field signals corresponding to the pipeline defects as outputs to construct a random forest regression model with $n_{trees}$ decision trees, to realize intelligent inversion for sizes of the pipeline defects.

The invention adopting the above technical solution has the following beneficial effects: according to the intelligent inversion method for pipeline defects based on heterogeneous field signals, provided by the invention, (1) a defect data pretreating method is designed, so that the unification of different defect signal dimensions can be realized without changing original information, and the stability of the heterogeneous field signals is improved; (2) a characteristic extraction method of the heterogeneous field signals is designed, so that deep characteristics of defects can be adaptively extracted in different scenes, thereby making up for the shortcomings of traditional characteristic extraction, such as serious subjective factors, long time consumption and low efficiency; and (3) an intelligent inversion method based on deep defect characteristics is designed, and has the advantages of high inversion accuracy and good stability.

DETAILED DESCRIPTION OF THE PREFERRED EMBODIMENT

Figure 1:
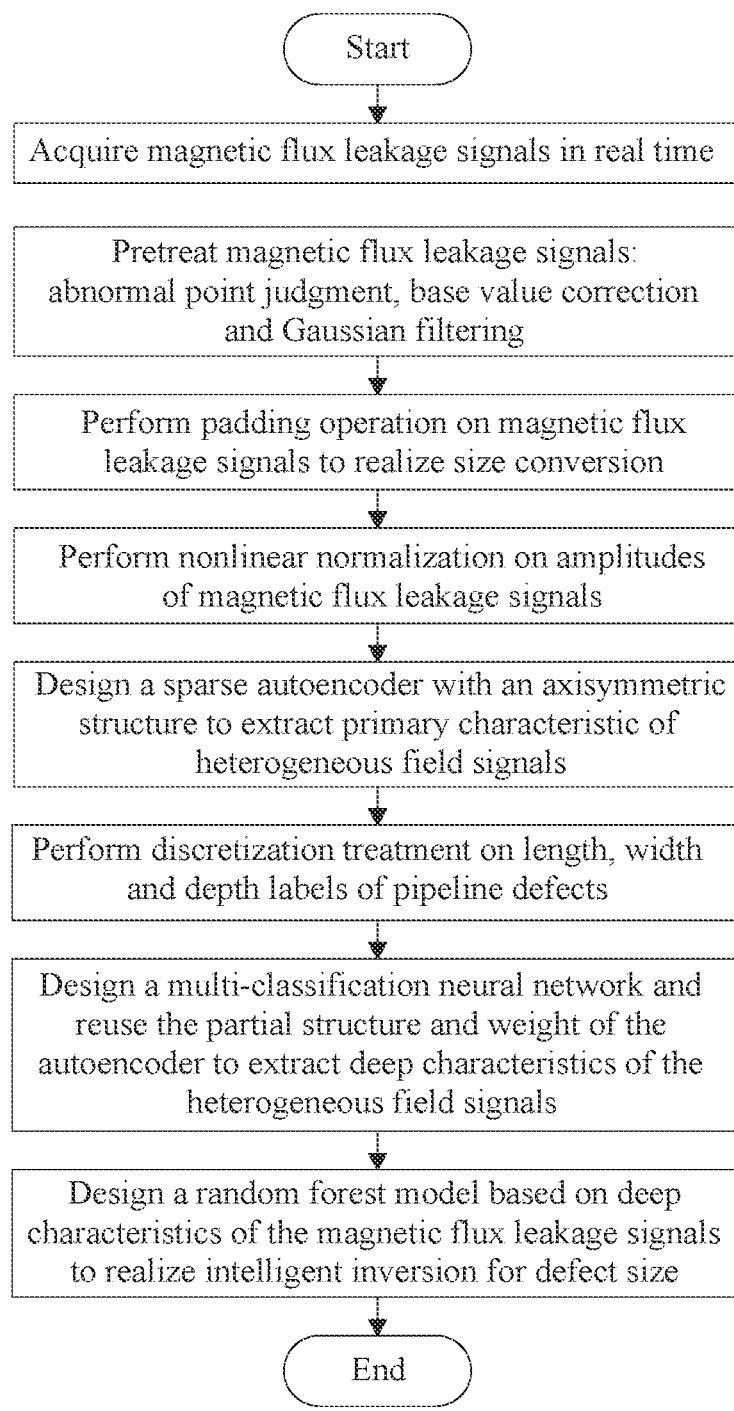
FIG. 1 is a flow chart of an intelligent inversion method for pipeline defects based on heterogeneous field signals according to the embodiment of the invention.

The specific embodiments of the invention will be further described in detail with reference to the figures and embodiments. The following embodiments are used to illustrate the invention, but not to limit the scope of the invention.

The embodiment takes magnetic flux leakage signals in heterogeneous field signals as an example, and uses an intelligent inversion method for pipeline defects based on heterogeneous field signals of the invention to inverse the defects of a certain section of an oil pipeline.

In the embodiments, the intelligent inversion method for pipeline defects based on heterogeneous field signals comprises the following steps.

Step 1: acquiring magnetic flux leakage signals of each sampling point in a certain section of a pipeline in real time, performing an abnormality judgement on the acquired magnetic flux leakage signals, and then correcting base values of the magnetic flux leakage signals of each sampling point by an improved average median method, wherein when a detector in the pipeline actually operates in the pipeline, due to environmental factors, original magnetic flux leakage signals collected by sensors contain some data abnormality points which need to be corrected, in addition, own performance differences lead to different outputs of different sensors in zero magnetic field environment, so that base values of the magnetic flux leakage signals acquired by the different sensors are also different, and base value correction is also needed.

Step 1.1: acquiring the magnetic flux leakage signals of each sampling point in a certain section of the oil pipeline in real time through a plurality of sensors, and determining the abnormal values of the magnetic flux leakage signals, wherein when an intensity $D_{(i,j)}$ of the magnetic flux leakage signals meets the following formula, the magnetic flux leakage signals are determined to be abnormal:

$$D_{(i,j+1)} - D_{(i,j)} > 50 \times (D_{(i,j)} - D_{(i,j-1)}).$$

Wherein $D_{(i,j)}$ is the intensity of the magnetic field signals of an i-th sensor at a sampling point j, $D_{(i,j-1)}$ is the intensity of the magnetic field signals of the i-th sensor at a sampling point j−1, $D_{(i,j+1)}$ is the intensity of the magnetic field signals of the i-th sensor at a sampling point j+1, i=1, 2, ..., I, I is the number of the sensors carried by a detector in the pipeline, j=1, 2, ..., J, and J is the number of sampling points in the pipeline.

If the magnetic flux leakage signals are abnormal signals, replacing the intensity of the heterogeneous field signals at an abnormal point with an average value of the intensity of the magnetic flux leakage signals at a sampling point before the abnormal point and a sampling point after the abnormal point.

Step 1.2: correcting the base values of the magnetic flux leakage signals of each sampling point, obtained by the sensors, wherein a base value correction method is as follows:

$$D_{(i,j)ans} = D_{(i,j)} - D_{(i,j)mid} + \sqrt{\frac{1}{k-2}\left(\sum_{j=1}^{k-3} D_{(i,j)} - D_{(i,j)max} - D_{(i,j)min} - D_{(i,j)mid}\right)^2},$$

$$D_{(i,j)mid} = \frac{V_{(i,j)mid} - V_{ref}}{P \cdot sens}.$$

Wherein $D_{(i,j)ans}$ is a signal intensity of the corrected magnetic flux leakage signals at the sampling point j by the i-th sensor; k represents the channel number of the sensors; $D_{(i,j)mid}$ is a median value of the magnetic flux leakage signals acquired by all channels of the i-th sensor at the sampling point j, and $D_{(i,j)max}$ is a maximum value of the magnetic flux leakage signals acquired by all channels of the i-th sensor at the sampling point j; $D_{(i,j)min}$ is a minimum value of the magnetic flux leakage signals acquired by all channels of the i-th sensor at the sampling point j; $V_{(i,j)mid}$ is a median value of output voltages of the i-th sensor; $V_{ref}$ is a reference voltage value of a Hall sensor carried by a detector in the pipeline; P is an amplification factor (generally taking 4) of the output voltage of the Hall sensor carried by the detector in the pipeline; and sens is sensitivity of the output voltage of the Hall sensor carried by the detector in the pipeline, and in the embodiments, $V_{ref}$ takes 2.5 V, P takes 4, and sens takes 3.125 my/Gs.

Step 2: denoising the magnetic flux leakage signals of each sampling point, treated in Step 1 by a wavelet analysis method.

According to characteristics of the acquired magnetic flux leakage signals at each sampling point by the sensors, selecting Sym10 as a wavelet basis function, and obtaining an intensity $D_{(i,j)result}$ of the denoised magnetic flux leakage signals through wavelet decomposition, heuristic wavelet thresholding and wavelet reconstruction.

Step 3: padding the denoised magnetic flux leakage signals corresponding to the pipeline defects, unifying the magnetic flux leakage signals of different sizes into the magnetic flux leakage signals of the same size, wherein 0 is used for completion in a direction (namely, x axis) of the sampling point, and a median value of the magnetic flux leakage signals is used for completion in a direction (namely, y axis) of the signal amplitudes, and performing a nonlinear transformation on the signal amplitudes.

Step 3.1: setting dimensions of a magnetic flux leakage signal matrix corresponding to a t-th pipeline defect, acquired by the 1-th sensor as $x_i^t \times y_i^t$, and by the padding operation, using 0 to complete a row vector of the magnetic flux leakage signal matrix to m on left and right sides of $x_i^t$, $m=\max(x_i^t)$, $t=1,2,\ldots,p$, wherein P is the total number of the pipeline defects in this section of the pipeline.

In the embodiments, m takes 64, and P takes 346.
When $$\frac{m - x_i^t}{2}$$

is an integer, inserting $$\frac{m - x_i^t}{2}$$

0s on the left and right sides of $x_i^t$.
When $$\frac{m - x_i^t}{2}$$

is not an integer, inserting $$\frac{m - x_i^t + 1}{2}$$

0s on the left side of $x_i^t$ and inserting $$\frac{m - x_i^t + 1}{2}$$

0s on the right side of $x_i^t$.

Step 3.2: by the padding operation, using the median value of the magnetic flux leakage signals to complete a column vector of the magnetic flux leakage signal matrix to n on upper and lower sides of $y_i^t$, $n=\max(y_i^t)$.

In the embodiments, n takes 46.
When $$\frac{n - y_i^t}{2}$$

is an integer, inserting a median value $b_{i-mid}$ of $$\frac{n - y_i^t}{2}$$

magnetic flux leakage signals on the upper and lower sides of $y_i^t$.
When $$\frac{n - y_i^t}{2}$$

is not an integer, inserting the median value $b_{i-mid}$ of $$\frac{n - y_i^t + 1}{2}$$

magnetic flux leakage signals on the upper side of $y_i^t$ and inserting the median value $b_{i-mid}$ of $$\frac{n - y_i^t + 1}{2}$$

magnetic flux leakage signals on the lower side of $y_i^t$.

Step 3.3: after treatment in steps 3.1 to 3.2, unifying the sizes of the magnetic flux leakage signals corresponding to all the pipeline defects, acquired by each sensor, to be m×n, and then performing the nonlinear transformation on the magnetic flux leakage signals with the unified sizes, and compressing the signal amplitudes.

In this embodiment, the following formula is used to perform the nonlinear transformation on the magnetic flux leakage signals to realize partial defect characteristic enhancement and convert the amplitude to −1~1, which is favorable for increasing the convergence speed of an autoencoding model;

$$X' = \tan\left(\left(\frac{X - X_{min}}{X_{max} - X_{min}} - \frac{1}{2}\right) \times \frac{\pi}{2}\right).$$

Wherein X' represents magnetic flux leakage signals after the nonlinear transformation, X represents the magnetic flux leakage signals corresponding to the pipeline defects with dimensions of m×n, $X_{max}$ is a maximum value of signals in a magnetic flux leakage signal matrix with dimensions of m×n, and $X_{min}$ is a minimum value of the signals in the magnetic flux leakage signal matrix with dimensions of m×n.

Step 4: converting the heterogeneous field signal matrix corresponding to the pipeline defects, treated by the nonlinear transformation, into a data matrix with the same input dimensions as a sparse autoencoder.

Converting the magnetic flux leakage signal matrix corresponding to the pipeline defects, with the dimensions of m×n and treated by the nonlinear transformation into the matrix $D'_{(m \times n, 1)}$ with dimensions of (m×n, 1) for preparation for subsequent neural network training.

Figure 2:
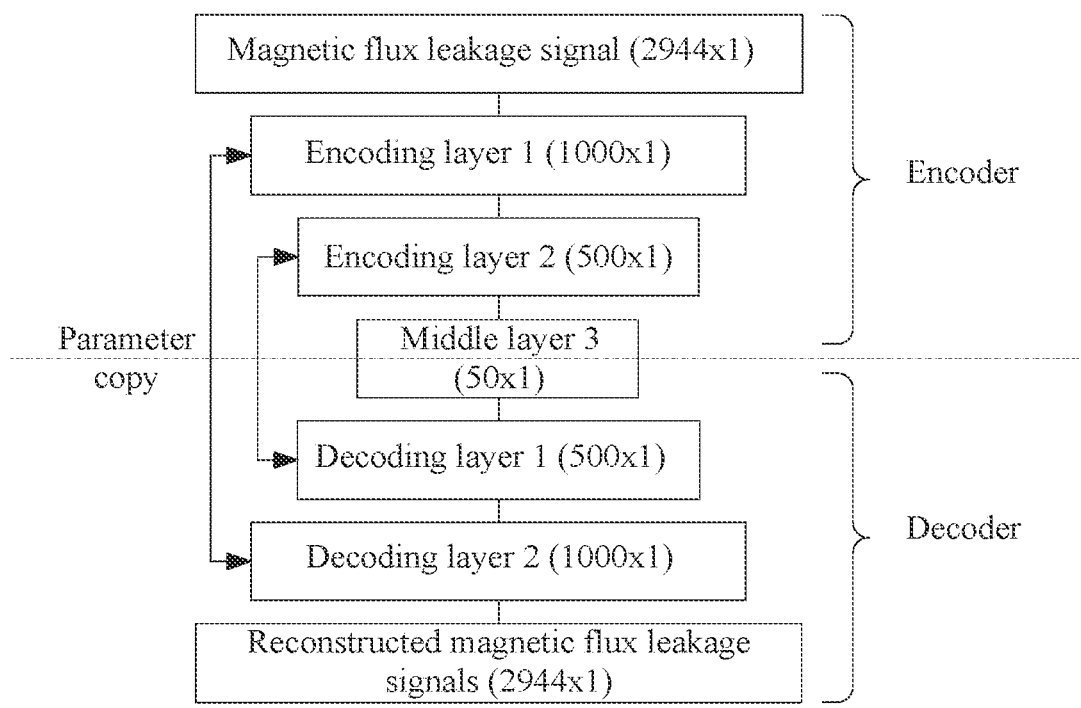
FIG. 2 is a schematic diagram of a sparse autoencoder with an axisymmetric structure to adaptively extract primary characteristics of heterogeneous field signals according to the embodiment of the invention.

Step 5: designing the sparse autoencoder with an axisymmetric structure as shown in FIG. 2, inputting the magnetic flux leakage signals $D'_{(m \times n, 1)}$ corresponding to the converted pipeline defects with the dimensions of (m×n,1) into the sparse autoencoder, obtaining primary characteristics of the magnetic flux leakage signals corresponding to the pipeline defects, and saving a weight of an encoding part of the sparse autoencoder.

Step 5.1: designing the sparse autoencoder with A layers with the axisymmetric structure, wherein first $$\frac{A+1}{2}$$

layers form an encoder part, last $$\frac{A+1}{2}$$

layers form a decoder part, A is an odd number greater than or equal to 3, and in the embodiment, A takes 7.

Step 5.2: copying weight $W_{Encoder}$ of the encoder part of the sparse autoencoder to the decoder part to halve parameters of the sparse autoencoder and increase training speed and reduce overfitting risks.

Step 5.3: setting the number of neurons in each layer of the sparse autoencoder to be $S_a$, a=1, 2, . . . , A, wherein inputs are the magnetic flux leakage signals $D'_{(m \times n, 1)}$ corresponding to all the pipeline defects with the dimensions of (m×n, 1), and outputs are eigenvectors $F_{(m \times n, 1)}$ reconstructed by the encoder part and the decoder part, using the following formula as a loss function of the sparse autoencoder, and training a sparse autoencoder model by minimizing the loss function, $$\text{error}(D_{(m \times n, 1)}, F_{(m \times n, 1)}) = \frac{\sqrt[3]{\sum_{t=1}^{p} \left(D^t_{(m \times n, 1)} - F^t_{(m \times n, 1)}\right)^2 + \alpha}}{p}.$$

Wherein error( ) is the loss function, $D'^t_{(m \times n, 1)}$ is magnetic flux leakage signals corresponding to the t-th pipeline defect with the dimensions of (m×n,1), $F^t_{(m \times n, 1)}$ is an eigenvector reconstructed by the encoder part and the decoder part, α is a paranoid factor, and its value range is 1.1~4.8.

In the embodiment, p takes 346, α takes 1.5, the number of neurons in a 7-layer sparse autoencoder is 2944, 1000, 500, 50, 500, 1000 and 2944, respectively, the input of the sparse autoencoder is $D'_{2944 \times 1}$, and the reconstructed characteristics $F_{2944 \times 1}$ are obtained through the 7-layer autoencoder.

Step 5.4: taking an eigenvector $F_{mid}$ of the $$\frac{A+1}{2}\text{-th}$$

layer of the sparse autoencoder as the primary characteristics of the magnetic flux leakage signals corresponding to the pipeline defects, in the embodiment, a size of $F_{mid}$ is 50×1;

Step 6: classifying lengths, widths and depths of the pipeline defects to obtain category labels of the pipeline defects.

Setting the number of categories of the lengths, the widths and the depths of the pipeline defects to be $n_{class}$ and classifying the lengths $y_{length}$, the widths $y_{width}$ and the depths $y_{depth}$ of the pipeline defects according to the following formula to obtain the category labels of the pipeline defects concerning the lengths, the widths and the depths, wherein $$y_{length-class} = \left[n_{class} \times \log_{10}\left(1 + \frac{y_{length} - y_{length-min}}{y_{length-max} - y_{length-min}} \times 9\right)\right],$$

$$y_{width-class} = \left[n_{class} \times \log_{10}\left(1 + \frac{y_{width} - y_{width-min}}{y_{width-max} - y_{width-min}} \times 9\right)\right], \text{ and}$$

$$y_{depth-class} = \left[n_{class} \times \log_{10}\left(1 + \frac{y_{depth} - y_{depth-min}}{y_{depth-max} - y_{depth-min}} \times 9\right)\right].$$

Wherein $y_{length-class}$, $y_{width-class}$ and $y_{deep-class}$ is the category labels for the lengths, the widths and the depths of the pipeline defects, $y_{length-max}$ is a maximum length of the magnetic flux leakage signals corresponding to all the pipeline defects, $y_{length-min}$ is a minimum length of the magnetic flux leakage signals corresponding to all the pipeline defects, $y_{width-max}$ is a maximum width of the magnetic flux leakage signals corresponding to all the pipeline defects, $y_{width-min}$ is a minimum width of the magnetic flux leakage signals corresponding to all the pipeline defects, $y_{depth-max}$ is a maximum depth of the magnetic flux leakage signals corresponding to all the pipeline defects, $y_{depth-min}$ is a minimum depth of the magnetic flux leakage signals corresponding to all the pipeline defects.

In the embodiment, $n_{class}$ takes 10, respectively dividing the lengths, the widths and the depths of the magnetic flux leakage signals of the defects into 10 categories, and discretely converting the labels to be 0~9 in the magnetic flux leakage signals corresponding to the pipeline defects, wherein the minimum length value $y_{length-min}$ is 8.6800, the maximum length value $y_{length-max}$ is 62.195, the minimum width value $y_{width-min}$ is 8.025, the maximum width value $y_{width-max}$ is 59.970, the minimum depth value $y_{depth-min}$ is 0.365, and the maximum depth value $y_{depth-max}$ is 10.160.

Figure 3:
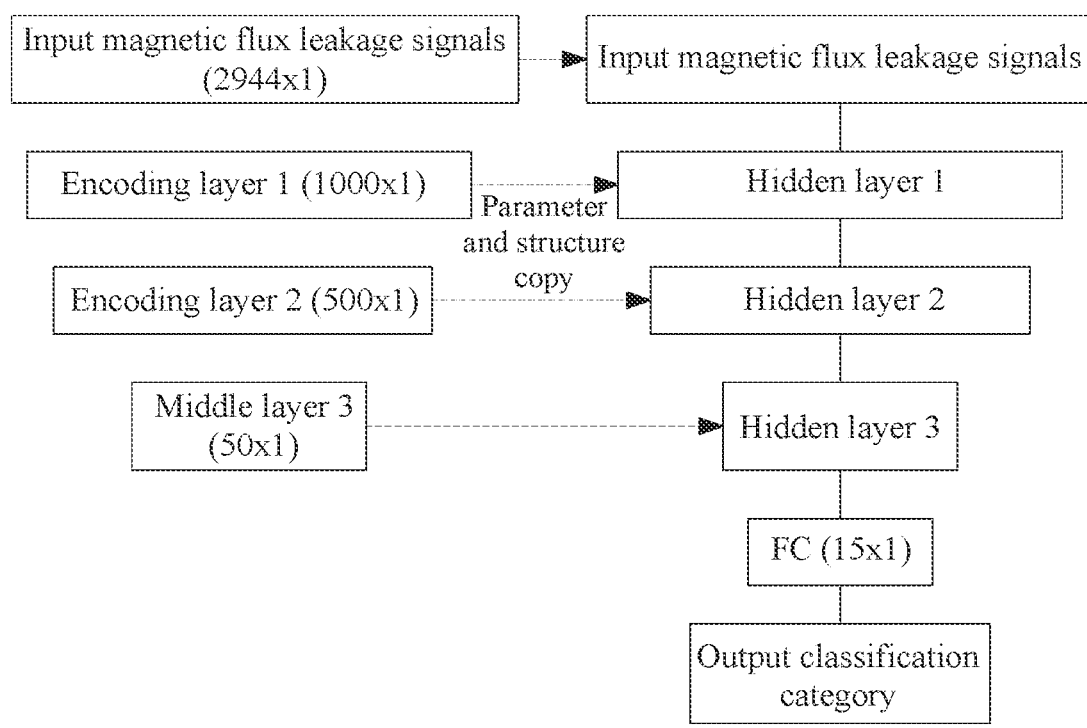
FIG. 3 is a schematic diagram of classification of magnetic flux leakage signals corresponding to pipeline defects in a supervised manner by a Softmax-based multi-classification neural network according to the embodiment of the invention.

Step 7: designing a Softmax-based multi-classification neural network as shown in FIG. 3 to classify the magnetic flux leakage signals corresponding to the pipeline defects in a supervised manner, and further extracting deep characteristics containing defect size information.

Step 7.1: designing a Softmax-based b-layer classification neural network, wherein $$b > \frac{A+1}{2},$$

and in the embodiment, A takes 7, and b takes 5.

Step 7.2: in the b-layer classification neural network, setting a structure and parameters of each layer in the first $$\frac{A+1}{2}$$

layers to be consistent with those of the encoding part of the sparse autoencoder, wherein the number of neurons in a 5-layer network in the example is 2944, 1000, 500, 50 and 15.

Step 7.3: setting the output category number of the classification neural network to be $n_{class}$, and using default neural network initialization parameters at a $$\frac{A+1}{2}$$

~b-th layer of the classification neural network.

Step 7.4: taking the magnetic flux leakage signals corresponding to the pipeline defects with dimensions of (m×n,1) as inputs, and the category labels of the lengths, the widths and the depths of each pipeline defect as outputs, and after training the classification neural network, taking characteristics $F_b$ of the b-th layer as the deep characteristics of the magnetic flux leakage signals corresponding to the pipeline defects, wherein in the embodiment, characteristics of a fifth layer in the classification neural network as the deep characteristics of the magnetic flux leakage signals, and the dimensions are 15×1.

Step 8: taking the deep characteristics $F_b$ of the magnetic flux leakage signals corresponding to the pipeline defects extracted in Step 7 as inputs, and real size information of the magnetic flux leakage signals corresponding to the pipeline defects as outputs to construct a random forest regression model with $n_{trees}$ decision trees, to realize intelligent inversion for sizes of the pipeline defects, wherein in the embodiment, $n_{trees}$ takes 30.

In the embodiments, the magnetic flux leakage signals of 346 defects are used for adaptive characteristic extraction and defect size inversion, with high accuracy and good stability, thereby achieving a good defect inversion effect.

Finally, it should be noted that the above embodiments are only used to illustrate the technical solution of the invention without limiting it. Although the invention has been described in detail with reference to the preceding embodiments, those skilled in the art should understand that they can still modify the technical solution recorded in the preceding embodiments, or replace some or all of the technical features equally. However, these modifications or substitutions do not make the essence of the corresponding technical solution deviate from the scope defined by the claims of the invention.

What is claimed is:

1. An intelligent inversion method for pipeline defects based on heterogeneous field signals, comprising the following steps:

Step 1: acquiring the heterogeneous field signals of each sampling point in a certain section of a pipeline in real time, performing an abnormality judgement on the acquired heterogeneous field signals, and then correcting base values of the heterogeneous field signals of the each sampling point by an improved average median method;

Step 2: denoising the heterogeneous field signals of the each sampling point, treated in Step 1, by a wavelet analysis method;

Step 3: padding the denoised heterogeneous field signals corresponding to the pipeline defects, unifying the heterogeneous field signals of different sizes into the heterogeneous field signals of the same size, wherein 0 is used for completion in a direction of the sampling point, and a median value of the heterogeneous field signals is used for completion in a direction of signal amplitudes, and performing a nonlinear transformation on the signal amplitudes;

Step 4: converting a heterogeneous field signal matrix corresponding to the pipeline defects, treated by the nonlinear transformation, into a data matrix with the same input dimensions as a sparse autoencoder;

Step 5: designing the sparse autoencoder with an axisymmetric structure, inputting the heterogeneous field signal matrix corresponding to converted pipeline defects into the sparse autoencoder, obtaining primary characteristics of the heterogeneous field signals corresponding to the pipeline defects, and saving a weight of an encoding part of the sparse autoencoder;

Step 6: classifying lengths, widths and depths of the pipeline defects to obtain category labels of the pipeline defects;

Step 7: designing a Softmax-based multi-classification neural network to classify the heterogeneous field signals corresponding to the pipeline defects in a supervised manner, and further extracting deep characteristics containing defect size information;

Step 8: taking the deep characteristics of the heterogeneous field signals corresponding to the pipeline defects extracted in Step 7 as inputs, and real size information of the heterogeneous field signals corresponding to the pipeline defects as outputs to construct a random forest regression model with $n_{trees}$ decision trees, to realize intelligent inversion for sizes of the pipeline defects; and Step 9: performing maintenance on the pipeline based on the constructed random forest regression model in Step 8.

2. The intelligent inversion method according to claim 1, wherein Step 1 specially comprises the following sub-steps:

Step 1.1: acquiring the heterogeneous field signals of the each sampling point in the certain section of the pipeline in real time through a plurality of sensors, and performing the abnormality judgement on the acquired heterogeneous field signals, wherein when an intensity $D_{(i,j)}$ of the heterogeneous field signals meets the following formula, the heterogeneous field signals are judged to be abnormal:

$$D_{(i,j+1)} - D_{(i,j)} > 50 \times (D_{(i,j)} - D_{(i,j-1)}),$$

wherein $D_{(i,j)}$ is the intensity of the heterogeneous field signals of an i-th sensor at a sampling point j, $D_{(i,j-1)}$ is the intensity of the heterogeneous field signals of the i-th sensor at a sampling point j−1, $D_{(i,j+1)}$ is the intensity of the heterogeneous field signals of the i-th sensor at a sampling point j+1, t=1, 2, . . . , I, I is the number of the sensors carried by a detector in the pipeline, J=1, 2, . . . , J and J is the number of sampling points in the pipeline; and if the heterogeneous field signals are abnormal signals, replacing the intensity of the heterogeneous field signals at an abnormal point with an average value of the intensity of the heterogeneous field signals at a sampling point before the abnormal point and the sampling point after the abnormal point; and Step 1.2: correcting the base values of the heterogeneous field signals of the each sampling point, obtained by the sensors, wherein a base value correction method is as follows:

$$D_{(i,j)ans} = D_{(i,j)} - D_{(i,j)mid} + \sqrt{\left(\frac{1}{k-2}\sum_{j=1}^{k-3} D_{(i,j)} - D_{(i,j)max} - D_{(i,j)min} - D_{(i,j)mid}\right)^2},$$

and $$D_{(i,j)mid} = \frac{V_{(i,j)mid} - V_{ref}}{P \cdot sens},$$

wherein $D_{(i,j)ans}$ is a signal intensity of the corrected heterogeneous field signals at the sampling point j by the i-th sensor; k represents channel number of the sensors; $D_{(i,j)mid}$ is the median value of the heterogeneous field signals acquired by all channels of the i-th sensor at the sampling point j, and $D_{(i,j)max}$ is a maximum value of the heterogeneous field signals acquired by all channels of the i-th sensor at the sampling point j; $D_{(i,j)min}$ is a minimum value of the heterogeneous field signals acquired by all channels of the 1-th sensor at the sampling point j; $V_{(i,j)mid}$ is a median value of output voltages of the i-th sensor; $V_{ref}$ is a reference voltage value of a Hall sensor carried by the detector in the pipeline; P is an amplification factor of the output voltage of the Hall sensor carried by the detector in the pipeline; and sens is sensitivity of the output voltage of the Hall sensor carried by the detector in the pipeline.

3. The intelligent inversion method according to claim 2, further comprising: in Step 2, according to characteristics of the acquired heterogeneous field signals at the each sampling point, selecting Sym10 as a wavelet basis function, and obtaining the intensity $D_{(i,j)result}$ of the denoised heterogeneous field signals through wavelet decomposition, heuristic wavelet thresholding and wavelet reconstruction.

4. The intelligent inversion method according to claim 3, wherein Step 3 specially comprises the following sub-steps:

Step 3.1: setting dimensions of the heterogeneous field signal matrix corresponding to a t-th pipeline defect, acquired by the i-th sensor, as $x^t_i \times y^t_i$, and by padding operation, using 0 to complete a row vector of the heterogeneous field signal matrix to m on left and right sides of $x^t_i$, m=max($x^t_i$), t=1, 2, . . . , p, wherein p is total number of the pipeline defects in this section of the pipeline;

Step 3.2: by the padding operation, using the median value of the heterogeneous field signals to complete a column vector of the heterogeneous field signal matrix to n on upper and lower sides of $y^t_i$, n=max ($y^t_i$); and Step 3.3: after treatment in steps 3.1 to 3.2, unifying the sizes of the heterogeneous field signals corresponding to all the pipeline defects, acquired by each sensor, to be m×n, then performing the nonlinear transformation on the heterogeneous field signals with the unified sizes, and compressing the signal amplitudes.

5. The intelligent inversion method according to claim 4, further comprising: in Step 4, converting the heterogeneous field signal matrix corresponding to the pipeline defects, with the dimensions of m×n and treated by the nonlinear transformation, into a matrix $D'_{(m\times n,1)}$ with dimensions of (m×n,1).

6. The intelligent inversion method according to claim 5, wherein Step 5 specially comprises the following sub-steps:

Step 5.1: designing the sparse autoencoder with A layers with the axisymmetric structure, wherein first $$\frac{A+1}{2}$$

layers form an encoder part, last $$\frac{A+1}{2}$$

layers form a decoder part, and A is an odd number greater than or equal to 3;

Step 5.2: copying the weight $W_{Encoder}$ of the encoder part of the sparse autoencoder to the decoder part to halve parameters of the sparse autoencoder;

Step 5.3: setting a number of neurons in each layer of the sparse autoencoder to be $S_a$, a=1, 2, . . . , A, wherein inputs are the heterogeneous field signals $D'_{(m\times n,1)}$ corresponding to all the pipeline defects with the dimensions of (m×n,1), and outputs are eigenvectors $F_{(m'n,1)}$ reconstructed by the encoder part and the decoder part, using the following formula as a loss function of the sparse autoencoder, and training a sparse autoencoder model by minimizing the loss function;

$$\text{error}(D_{(m\times n,1)}, F_{(m\times n,1)}) = \frac{\sqrt[3]{\sum_{t=1}^{p} (D^t_{(m\times n,1)} - F^t_{(m\times n,1)})^2 + \alpha}}{p},$$

wherein error( ) is the loss function, $D'^t_{(m\times n,1)}$ is the heterogeneous field signals corresponding to the t-th pipeline defect with the dimensions of (m×n, 1) $F^t_{(m\times n,1)}$ is an eigenvector reconstructed by the encoder part and the decoder part, a is a paranoid factor, and its value range is 1.1-4.8; and Step 5.4: taking an eigenvector $F_{mid}$ of the $$\frac{A+1}{2}\text{-th}$$

layer of the sparse autoencoder as the primary characteristics of the heterogeneous field signals corresponding to the pipeline defects.

7. The intelligent inversion method according to claim 6, further comprising: in Step 6, setting the number of categories of the lengths, the widths and the depths of the pipeline defects to be $n_{class}$, and classifying the lengths $y_{length}$, the widths $y_{width}$ and the depths $y_{depth}$ of the pipeline defects according to the following formulas to obtain the category labels of the pipeline defects concerning the lengths, the widths and the depths, wherein $$y_{length-class} = \left\lfloor n_{class} \times \log_{10}\left(1 + \frac{y_{length} - y_{length-min}}{y_{length-max} - y_{length-min}} \times 9\right)\right\rfloor,$$

$$y_{width-class} = \left\lfloor n_{class} \times \log_{10}\left(1 + \frac{y_{width} - y_{width-min}}{y_{width-max} - y_{width-min}} \times 9\right)\right\rfloor, \text{ and}$$

$$y_{depth-class} = \left\lfloor n_{class} \times \log_{10}\left(1 + \frac{y_{depth} - y_{depth-min}}{y_{depth-max} - y_{depth-min}} \times 9\right)\right\rfloor,$$

wherein $y_{length-class}$, $y_{width-class}$, and $y_{decv-class}$ are the category labels for the lengths, the widths and the depths of the pipeline defects, $y_{length-max}$ is a maximum length of the heterogeneous field signals corresponding to all the pipeline defects, $y_{length-min}$ is a minimum length of the heterogeneous field signals corresponding to all the pipeline defects, $y_{width-max}$ is a maximum width of the heterogeneous field signals corresponding to all the pipeline defects, $y_{width-min}$ is a minimum width of the heterogeneous field signals corresponding to all the pipeline defects, $y_{depth-max}$ is a maximum depth of the heterogeneous field signals corresponding to all the pipeline defects, and $y_{depth-min}$ is a minimum depth of the heterogeneous field signals corresponding to all the pipeline defects.

8. The intelligent inversion method according to claim 7, wherein Step 7 specially comprises the following sub-steps:

Step 7.1: designing a Softmax-based b-layer classification neural network, wherein $$b > \frac{A+1}{2};$$

Step 7.2: in the b-layer classification neural network, setting a structure and parameters of each layer in the first $$\frac{A+1}{2}$$

layers to be consistent with those of the encoding part of the sparse autoencoder;

Step 7.3: setting the output category number of the classification neural network to be $n_{class}$, and using default neural network initialization parameters at a $$\frac{A+1}{2}$$

$-b$-th layer of the classification neural network; and

Step 7.4: taking the heterogeneous field signals corresponding to the pipeline defects with dimensions of (m×n,1) as inputs, and the category labels of the lengths, the widths and the depths of each pipeline defect as outputs, and after training the classification neural network, taking characteristics $F_b$ of the b-th layer as the deep characteristics of the heterogeneous field signals corresponding to the pipeline defects.

\* \* \* \* \*